United States Patent
Ek et al.

(10) Patent No.: US 10,308,798 B2
(45) Date of Patent: Jun. 4, 2019

(54) COMPOSITION BASED ON RECYCLED POLYETHYLENE FROM CABLE WASTE

(71) Applicant: BOREALIS AG, Vienna (AT)

(72) Inventors: Carl-Gustaf Ek, Vastra Frolunda (SE); Asa Wannerskog, Gothenburg (SE); Stefan Rieder, Seeheim-Jugenheim (DE); Franz Ruemer, St.Georgen/Gusen (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/536,616

(22) PCT Filed: Dec. 18, 2015

(86) PCT No.: PCT/EP2015/080404
§ 371 (c)(1),
(2) Date: Jun. 15, 2017

(87) PCT Pub. No.: WO2016/102341
PCT Pub. Date: Jun. 30, 2016

(65) Prior Publication Data
US 2018/0327583 A1    Nov. 15, 2018

(30) Foreign Application Priority Data

Dec. 22, 2014 (EP) ..................... 14199529

(51) Int. Cl.
| | |
|---|---|
| *C08L 23/06* | (2006.01) |
| *C08L 23/26* | (2006.01) |
| *B29C 43/00* | (2006.01) |
| *B29C 43/02* | (2006.01) |
| *C08J 3/20* | (2006.01) |
| *B29K 23/00* | (2006.01) |
| *B29K 509/06* | (2006.01) |

(52) U.S. Cl.
CPC ............ *C08L 23/26* (2013.01); *B29C 43/003* (2013.01); *B29C 43/02* (2013.01); *C08J 3/201* (2013.01); *C08L 23/06* (2013.01); *B29K 2023/0691* (2013.01); *B29K 2509/06* (2013.01); *C08J 2323/06* (2013.01); *C08J 2323/26* (2013.01); *C08J 2423/06* (2013.01); *C08J 2423/26* (2013.01)

(58) Field of Classification Search
CPC .................. C08L 23/06; C08L 23/26
See application file for complete search history.

(56) References Cited

U.S. PATENT DOCUMENTS 4,123,584 A    10/1978    Brewton

FOREIGN PATENT DOCUMENTS

| CN | 102898768 A | 3/2015 |
|---|---|---|
| EP | 0847842 A1 | 6/1998 |
| JP | S53111375 A | 9/1978 |
| JP | S56106939 A | 8/1981 |
| JP | H09157467 A | 6/1997 |
| JP | H10230520 A | 9/1998 |
| JP | 2002080671 A | 3/2002 |
| JP | 2005349686 A | 12/2005 |
| JP | 2010235702 A | 10/2010 |
| JP | 2011105882 A | 6/2011 |
| JP | 2013045643 A | 3/2013 |
| JP | 2014523462 A | 9/2014 |

OTHER PUBLICATIONS

Li et al., "Reclamation of Waste Cross-linked Polyethylene by Mechanochemical Milling and Properties of PE-XL/PE-HD Blends", vol. 23, No. 1, Jan. 2009, pp. 95-100.
Office Action for Chinese Application No. 201580068410.2, dated Jan. 2, 2018.
European Search Report dated Apr. 13, 2015.
Boss, Annika, et al. "New Technology for Recycling of Plastics from Cable Waste", Paper presented at 8th International Conference on Insulated Power Cables, Versailles, Jun. 19-23, 2012.
Japanese Office action for Patent Application No. 2017-527704.
Korean Office action for Patent Application No. 10-2017-7017363.
Office action for Chinese Patent Application No. 201580068410.2, dated Oct. 24, 2018.
Hanqin, et al., "Technology and Application of Solid Waste Resource Utilization in Chemical Industry".

*Primary Examiner* — Peter D. Mulcahy
(74) *Attorney, Agent, or Firm* — Tarolli, Sundheim, Covell & Tummino LLP

(57) ABSTRACT

The invention is related to a polyethylene composition characterized in that it comprises a base resin and an inorganic mineral filler which is present in the composition in an amount of 1 to 50 wt % in respect to the weight of composition, wherein said base resin comprises: a) a first crosslinked polyethylene (PEX) having a gel content (measured according to ASTM D 2765:2006) in the range of 5% to 80% in respect to the weight of crosslinked polyethylene (PEX), said crosslinked polyethylene (PEX) being obtained from recycled wastes and b) a second polyethylene (PE) selected from virgin polyethylene and recycled polyethylene, or mixtures thereof. The invention is further related to a process for production of said polyethylene composition, and use of the polyethylene composition.

13 Claims, No Drawings

COMPOSITION BASED ON RECYCLED POLYETHYLENE FROM CABLE WASTE

The present invention relates to a new polyethylene composition which comprises at least one polyethylene obtained from recycled waste material. Furthermore, the present invention relates to a process for producing said polyethylene composition and the use of said composition in infrastructure, engineering applications and packaging applications.

For the purposes of the present description and of the subsequent claims, the term "recycled waste" is used to indicate the material recovered from both post-consumer waste and industrial waste. Namely, post-consumer waste refers to objects having completed at least a first use cycle (or life cycle), i.e. having already served their first purpose; while industrial waste refers to the manufacturing scrap which does normally not reach a consumer. Respectively, the term "virgin" denotes the newly-produced materials and/or objects prior to first use and not being recycled.

Nowadays, the attempt of using polymers obtained from waste materials for the manufacturing of new products is of increasing interest and importance for ecological reasons and for reducing costs.

In the field of cables, some efforts have already been undertaken in order to use recycled polymer materials from cable waste, in particular polyethylene or polyvinyl chloride obtained from waste cable sheaths. Said recycled polymer materials are generally used for making cable coating layers.

An example of one of those efforts is JP2002/080671 which discloses a polyvinyl chloride-based recycled plastic composition obtained by mixing and melting covering plastics and sheaths of waste cables containing: (A) polyvinyl chloride and (B) polyethylene or silane-crosslinked polyethylene, with chlorinated polyethylene. The abovementioned polyvinyl chloride-based resin is said to be useful for making cable sheaths.

JP2013045643 relates to insulated electric wire and cable which use a large amount of waste-derived recycled material which contains crosslinked polyolefin homopolymer. The recycled fraction containing cross-linked material has a gel content of 40% or less and the recycled material is present in an amount of 75 wt % or more in respect of the total composition.

CN102898768 discloses a flame retardant TPE composition made from cross-linked polyethylene cable waste. The amount of cross-linked cable waste is 40% or less and contains furthermore SBS block co-polymer (major part), phosphate flame retardants, extending oil, silane coupling agents and a very low amount of other auxiliaries. The prepared TPE is provided with good flame retardance and other performances up to standards.

However, the use of recycled polymer as described above in the prior art shows some drawbacks. In particular, it is presumed by the man skilled in the art that the use of recycled waste containing a crosslinked polyethylene (so-called 'PEX') fraction, may lead to poor mechanical properties compared to those obtained from virgin polyethylene materials. The reason of this presumption is the concept that crosslinked fractions would be acting like a filler with poor compatibility or adhesion to the thermoplastic parts of the compound. The weakest part of the compound is then the interface between the cross-linked particles and the thermoplastic matrix therefore the interface will act as an initiation and propagation enabler for crazes and cracks. The mechanical properties become particularly worse when high stresses, high speed (impact), high elongation and elevated temperatures come into play. Moreover, it is difficult to utilize a recycled waste material with high crosslinked content and/or having large particles, especially with conventional melt processing methods due to lower processing speed and higher costs.

Consequently, due to cost reasons, poor mechanical properties, as well as inferior processing properties the waste streams containing crosslinked polyolefin, especially crosslinked polyethylene (PEX), are more often used for energy recovery (e.g. incineration in a district heating plant or for heat generation in the cement industry) but less recycled into new products.

Thus, there is still a need for developing methods to increase the use of recycled material into (higher value) products. Additionally, there is a need for improved polymer materials containing crosslinked polyethylene obtained from recycled waste. Those improved materials could advantageously be used in a broader application field than today. It is therefore the object of the present invention to overcome or at least reduce the above mentioned disadvantages and to fulfill requirements for higher value products, i.e. to extend the use in existing and new applications.

This objective has been reached by providing a polyethylene composition characterized in that it comprises a base resin and an inorganic mineral filler which is present in the composition in an amount of 1 to 50 wt % in respect to the weight of composition, wherein said base resin comprises:

(a) a first crosslinked polyethylene (PEX) having a gel content (measured according to ASTM D 2765:2006) in the range of 5% to 80% in respect to the weight of crosslinked polyethylene (PEX), said crosslinked polyethylene (PEX) being obtained from recycled waste, and (b) a second polyethylene (PE) selected from virgin polyethylene and recycled polyethylene, or mixtures thereof.

It has surprisingly been found that the polyethylene composition according to the invention has an improved balance between stiffness, as shown by their flexural modulus, and good ductility in terms of elongation at break as well as stress at break. Further, the composition shows a surprisingly good impact performance. The composition in the present invention shows mechanical properties which at least have reduced the gap with the properties of virgin polyethylene. An additional advantage is that the carbon foot print of the articles that are manufactured from recycled PEX is lower compared to products made of virgin products.

The term "base resin" denotes the entirety of polymeric components in the polyethylene composition according to the invention. Optionally, the base resin can comprise additional polymer components. Preferably, the base resin consists of the first crosslinked polyethylene (PEX) and the second polyethylene (PE).

The term "crosslinked" in "crosslinked polyethylene (PEX)" can be described and measured by its gel content. It should be noted that the crosslinked polyethylene (PEX) in the present invention can be referring to a polyethylene composition comprising a fraction (A1) of fully crosslinked polyethylene and a fraction of non-crosslinked thermoplastic polyethylene (A2). The fully crosslinked polyethylene A1, generally has a gel content in the range of 50% to 80%, preferably in the range of 55% to 70%, based on the weight of fraction A1. The gel content of the crosslinked polyethylene (component A), is generally in the range of 5% to 80%, preferably in the range of 20% to 65%, more preferably in the range of 40% to 60% while being measured in respect of the total weight of PEX. Generally, the fraction A1 has a weight percentage of between 20% and 100%, suitably of between 25% and 90%, more suitably of between 30% and 80%, based on the weight sum of A1 and A2.

It is the essence of the present invention that the PEX is obtained from recycled waste. The PEX can be either recycled post-consumer waste, industrial PEX waste from the cable manufacturing process, or alternatively, a combination of both. Preferably, the PEX in the present invention is obtained from recycled waste by means of plastic recycling processes known in the art. For example, said product may be obtained by means of a recycling process referred to as "PlastSep", which originally is developed by a company in the NKT group and described in the reference document "'New Technology for Recycling of Plastics from Cable Waste', Paper presented at 8$^{th}$ International Conference on Insulated Power Cables, Versailles, 19-23 Jun. 2012, by Annika Boss et al." More preferably, the PEX obtained from this kind of process is generally in the form of granules with a diameter of less than 1 mm.

It is essential in the invention that the second polyethylene (PE) is a non-crosslinked thermoplastic polyethylene, which enables good processability and good compounding results with the crosslinked polyethylene (PEX). The second polyethylene can be selected from virgin polyethylene, recycled thermoplastic polyethylene or a mixture thereof.

The inorganic filler is an essential part of the composition according to the invention. Fillers are generally added to improve the mechanical properties, in particular the E-modulus.

In addition to the base resin and the inorganic filler, usual additives for utilization with polyolefins may be present in the polyethylene composition according to the invention. Examples of additives for use in the composition are pigments or dyes (for example carbon black), stabilizers (anti-oxidant agents), anti-acids and/or anti-UVs, antistatic agents and utilization agents (such as processing aid agents) Generally, the amount of these additives is in the range of 0-8 wt %, preferably in the range of 0-5 wt %, more preferably in the range of 0.01 to 3 wt %, based on the weight of total composition.

In the following the present invention is described in more detail.

In a preferred embodiment of the present invention, the weight ratio of PEX to PE in the base resin is in the range of higher than 10:90 to 90:10, preferably in the range of 10:90 to 70:30, more preferably in the range of 10:90 to 50:50.

In a preferred embodiment of the present invention, the crosslinked polyethylene (PEX) is obtained from the recycled material from electrical cable waste. More preferably, the PEX is obtained from recyclates of the high voltage (HV) and medium voltage (MV) power cable waste.

It is known that the electrical cable waste is mainly a mixture of various compositions including PE or PEX based compositions and PVC based compositions. Therefore after the separating step in the recycling process, a certain level of contamination caused by the PVC is probably present in the recycled PEX. This contamination leads to higher chlorine content in the recycled PEX, compared to the normal chlorine content in virgin polyethylene, especially the chlorine level in low pressure polymerized PE such as LLDPE, MDPE and HDPE, where the chlorine level is due to remaining catalyst residues.

By similar reasons, also contaminants from the cable conductor (either aluminum or copper) are generally present in the recycled PEX.

Therefore in a further preferred embodiment of the present invention, the crosslinked polyethylene (PEX) has a chlorine content in the range of 100 to 5000 ppm, preferably of 200 to 4000 ppm, most preferably of 300 to 2000, measured with X-ray fluorescence analysis (XRF).

Furthermore, it is preferred that the crosslinked polyethylene (PEX) has a copper content in the range of 20-500 ppm, more preferably in the range of 30 to 250 ppm, and/or an aluminum content in the range of 500-15000 ppm, more preferably in the range of 1000-10000 ppm, measured with X-ray fluorescence analysis (XRF).

It is particularly preferred that the second polyethylene (PE) in the present invention is selected from virgin high density polyethylene (vHDPE), virgin medium density polyethylene (vMDPE), recycled high density polyethylene (rHDPE), recycled medium density polyethylene (rMDPE) and the mixtures thereof. The higher weight percentage of high density PE in respect of total base resin is preferred when higher stiffness of the material is desired. Preferably, when PE is selected from virgin PE, it has a density of equal to or higher than 0.925 g/cm$^3$, more preferably equal to or higher than 0.945 g/cm$^3$; when PE is selected from recycled PE, it comprises more than 80%, preferably more than 90% of polyethylene having a density of not lower than 0.925 g/cm$^3$, more preferably not lower than 0.945 g/cm$^3$.

In the composition according to the present invention, preferably inorganic mineral filler is present in an amount of at least 1 wt. %, more preferably at least 5 wt. %, still more preferably at least 8 wt. %, still more preferably at least 10 wt. % and most preferably at least 12 wt. %. Furthermore, in the composition inorganic filler is present in an amount of at most 50 wt. %, more preferably of at most 45 wt. %, still more preferably at most 40 wt. %. Generally, in the composition according to the present invention preferably inorganic mineral filler is present in a range of 1-50 wt %, preferably 5-45 wt %, more preferably 8-42 wt %, most preferably 10-40 wt %. The filler of the composition according to the invention may comprise all inorganic filler materials as known in the art. The filler may also comprise a mixture of any such filler materials. Examples for such filler materials are oxides, hydroxides and carbonates of aluminum, magnesium, calcium and/or barium. Preferably, the filler comprises an inorganic compound of a metal of groups 1 to 13, more preferred groups 1 to 3, still more preferred groups 1 and 2 and most preferred group 2, of the Periodic Table of Elements. The numbering of chemical groups, as used herein, is in accordance with the IUPAC system in which the groups of the periodic system of the elements are numbered from 1 to 18. Preferably, the inorganic filler comprises a compound selected from carbonates, oxides and sulphates. Preferred examples of such compounds are calcium carbonate, talc, magnesium oxide, huntite Mg$_3$Ca(CO$_3$)$_4$, and hydrated magnesium silicate, and kaolin ("China clay"), with particularly preferred examples being calcium carbonate, magnesium oxide, hydrated magnesium silicate, and kaolin ("China clay").

Further preferred, the inorganic filler has a weight average mean particle size, D50, of 25 micron or below, more preferably of 15 micron or below. Preferably, only 2 wt % of the filler has a particle size of 40 microns or higher, more preferably only 2 wt % of the filler has a particle size of 30 micron or higher.

In a preferred embodiment in which CaCO$_3$ is used as filler, preferably the particles have a weight average mean particle size D50 of 6 micron or below, more preferably of 4 micron or below. The weight percentage of the filler in the total composition is preferred to be in the range of 20-45%.

In said embodiment, preferably only 2 wt % has a particle size of 8 micron or more, more preferably of 7 micron or more.

In another preferred embodiment in which talc is used as filler, the weight percentage of the filler in the total composition is preferred in the range of 5-30%.

Generally, the purity of the filler is 94% or higher, preferably is 95% or higher and more preferably 97% or higher.

The inorganic filler may comprise a filler which has been surface-treated with an organosilane, a polymer, a carboxylic acid or salt etc. to aid processing and provide better dispersion of the filler in the organic polymer. Such coatings usually do not make up more than 3 wt % of the filler.

Accordingly, the polyethylene composition in the present invention is generally having a gel content in the range of 5-50 wt %, preferably 7-40 wt %, more preferably 10-40 wt % in respect to the weight of the base resin as measured according to ASTM D 2765:2006.

The composition according to the invention has a good balance of stiffness and ductility as compared to prior art materials. It should be noted that the composition in the present invention is characterized not by any single one of the defined mechanical property features, but by their combination. By this combination of features it can advantageously be used in many application fields.

Accordingly, the polyethylene composition is therefore characterized in that it has a flexural modulus determined according to ISO 178 of more than 840 MPa, preferably more than 1000 MPa, more preferably more than 1100 MPa and more than 1200 MPa.

In addition, the composition according to the present invention is further characterized in that it has an elongation at break determined according to ISO 527-2 of more than 2%, preferably more than 3%, more preferably more than 4%, most preferably more than 5%.

Furthermore, the composition in the present invention preferably has a tensile stress at break determined according to ISO 527-2 of more than 13 MPa, preferably more than 14 MPa, more preferably more than 15 MPa, most preferably more than 16 MPa.

Still further, the composition in the present invention preferably has a yield stress determined according to ISO 527-2 of more than 15 MPa, preferably more than 17 MPa, more preferably more than 19 MPa, most preferably more than 20 MPa.

Another embodiment of the present invention relates to a process for producing the polyethylene composition comprising the steps of
 a) feeding the ingredients into the inlet hopper of a compounding unit;
 b) compounding the ingredients which compounding is carried out by homogenizing the ingredients fed into the inlet and raising the temperature to above the melting point of the main thermoplastic polymer ingredient, obtaining a mixture compound;
 c) optionally cooling down the said mixture compound and pelletizing.

Optionally, prior to the melted homogenizing step an additional dry mixing step of all components can be applied.

Typically the melt temperature at the outlet of the compounding unit is around 180-220° C. for polyethylene compounds in order to create a sufficient mixing effect. The melt temperature at the outlet of the homogenization unit could however be both higher and lower depending on the needs. Particularly for compounds which are difficult to disperse and homogenize, the outlet temperature could be as high as 300° C. For less demanding compounds and compounds which are sensitive to heat and/or when energy costs are of key importance, the homogenization would take place below around 180° C. and lower, e.g. at 170° C. or 160° C. or even lower. Particularly for recycled material with often additional, contaminating ingredients, the target would be to make the compounding step with an as low as possible melt temperature for keeping the cost of the product low, to increase the sustainability effort and for minimizing the additional odour and smell that is often generated with recyclate containing compounds at high temperatures from e.g. contaminating ingredients in the recyclate.

Preferably, in the melt-homogenization step the PEX, PE and the inorganic filler and, optionally, other additives or other polymer components can be added to the inlet hopper of a compounding unit. The compounding unit could also be equipped with more than one inlet, e.g. two inlets, and e.g. all the polymeric ingredients, optionally with additives/antioxidants, could be fed in the first inlet and the filler fed in the 2nd inlet further downstream the unit. Alternatively e.g. all the polymers optionally with additives/antioxidants could be fed in the first inlet including part of the filler portion and the remaining part of the filler to be fed into the 2nd inlet further downstream.

The compounding unit could be any conventionally used compounding or extruder unit, preferably a co-rotating or counter-rotating twin screw extruder, or an internal mixer such as a Banbury type mixer or single crew extruder such as a Buss co-kneader or a conventional single screw extruder. Static mixers such as Kenics, Koch etc can also be used in addition to the compounding or extruder units mentioned in order to improve the distribution of the filler in the polymer matrix.

More preferably and especially for recycled materials the extruder or compounding unit is equipped with one or more vacuum degassing units along the screw or screws, with or without the use water stripping units. The function of a water stripping unit is to add small amounts of water into the melt upfront of a mixing and a decompression and vacuum degassing section. The resultant of this is to bring down both the smell and odour, as well as reducing the amount of volatiles in the final compound.

Further, the present invention is related to the use of a polyethylene composition as described hereinbefore for reducing the carbon foot print of the articles that are originators of the PEX. This is especially advantageous in the field of infrastructure, engineering applications and packaging.

Still further, the present invention is related to the use of the polyethylene composition according to the invention for reducing the carbon foot print in the production of pipes and cables, traffic and construction elements as well as packaging materials.

Preferably, the present invention is related to the use of the polyethylene composition according to the invention for reducing the carbon foot print in the production of objects listed below:
 Non-pressure underground pipes and system parts for road and land drainage, for storm water applications,
 Cable protection, cable conduits both for underground applications, for road and rail applications, cable channels, cable marking and cable digging protection sheets and pipes,
 Road (and rail) side structure, include all types of auxiliary structures found along roadways (e.g., signs, roadway lighting systems, rail and barrier systems, sound and wind barriers, crash cushions etc.), Floor and floor protection, indoor and outdoor,
Roofing materials and ingredient for roofing materials.

The following examples serve to further illustrate the present invention without limiting it.

EXAMPLES AND MEASURING METHODS

The following definitions of terms and determination methods apply for the above general description of the invention as well as to the below examples unless otherwise defined.

1. Measuring Methods

Gel Content (wt %): is measured according to ASTM D2765-90 using a sample consisting of the polyethylene composition of the invention (Method A, decaline extraction).

X-ray Fluorescence analysis (XRF): The elemental content was analysed by wavelength dispersive XRF (AXS S4 Pioneer Sequential X-ray Spectrometer supplied by Bruker). The pellet sample was pressed to a 3 mm thick plaque (150° C. for 2 minutes, under pressure of 5 bar and cooled to room temperature). Generally, in XRF method, the sample is irradiated by electromagnetic waves with wavelengths 0.01-10 nm. The elements present in the sample will then emit fluorescent X-ray radiation with discrete energies that are characteristic for each element. By measuring the intensities of the emitted energies, quantitative analysis can be performed. Here, the analysis has been done with a standard-free program where the 28 most common elements are detected and the concentrations of the detected elements are calculated based on a $CH_2$ matrix.

Flexural modulus: is determined on compression molded sample according to ISO 178 at 23° C., the sample thickness is mentioned below in the sample preparation.

Tensile testing: Tensile stress and modulus for the examples 1E1-5, CE3-5 were determined on compression moulded specimens according to ISO 527-2 at 50 mm/min and 23° C., the sample thickness is mentioned below in the sample preparation. Tensile test for the examples 1E6 and CE1, 2, 6-8 was measured according to ISO 527-2 on injection moulded specimens as described in EN ISO 1872-2 (80×10×4 mm), wherein the crosshead speed for testing the modulus was 1 mm/min and crosshead speed for testing the tensile strength and elongations was 50 mm/min.

Test specimen produced as described in EN ISO 1872-2 (the produced test specimens were 10 multipurpose test specimen of type B according to ISO 3167).

Charpy impact test: The charpy notched impact strength (Charpy NIS) is measured according to ISO 179 1eA at 23° C. and −20° C. respectively. The impact is measured on samples prepared from injection molded specimens as described in EN ISO 1872-2 (80×10×4 mm)

2. Examples

Base Resin
PEX:
PEX RECYCLATE 1 MM: a crosslinked polyethylene which is entirely recycled post-consumer cable waste is in the form of granules smaller than 1 mm in diameter. The PEX has a gel content of about 50 wt %. Table 1 shows the analytical result of PEX RECYCLATE 1 MM

TABLE 1

Elemental content determined by XRF analysis on three pressed 3 mm plaques.

| | |
|---|---|
| Zinc | 48 ppm |
| Titan | 82 ppm |
| Calcium | 955 ppm |
| Sulphur | 125 ppm |
| Silicon | 316 ppm |
| Aluminium | 1450 ppm |
| Magnesium | 191 ppm |
| Chlorine | 389 ppm |
| Cupper | 59 ppm |
| Iron | 61 ppm |
| Nickel | <5 |
| Phosphorus | <5 |
| Chromium | <5 |
| Potassium | <5 |
| Vanadinium | <5 |

HE3450: a virgin high density polyethylene bimodal copolymer, commercially available from *Borealis* with a melt flow rate (MFR2) of 0.5 g/10 min, according to ISO 1133 (190° C., 2.16 kg) and a density of 0.950 g/cm³.

KRUTENE-HD: a recycled high density polyethylene in the form of pellets, commercially available from KRUSCHITZ GMBH with a melt flow rate (MFR2) of 0.49 g/10 min, according to ISO 1133 (190° C., 2.16 kg), and density of 0.950 g/cm³.

Inorganic Filler

CALCITEC M/5: Calcium carbonate filler which had a weight average mean particle size D50 of 5.0 microns with only 1 wt % having a particle size of 19 micron or higher, and a purity of 99% $CaCO_3$.

MISTRON 75-6 A: Talc filler which has a weight average mean particle size D50 of 4.0 microns with only 2 wt % having a particle size of 20 micron or higher and a purity of 98% Mg-silicate.

Compounding and Preparation of Injection Moulded and Compression Moulded Samples The predetermined amount of PEX and PE was mixed with the inorganic filler in a Brabender 350E mixer with a roller element at a temperature of 180° C. for 10 min. The screw speed was 40 RPM. The equipment was purged with nitrogen during the homogenisation to minimise degradation.

Injection Moulding:
The test specimens for the examples 1E6 and CE1, 2, 6-8 were injection moulded using a machine Engel e-motion 310/55HL with a 35 mm screw at 210° C.

Compression Moulding:
The test specimens for the examples 1E1-5, CE3-5 were compression moulded. The raw materials were transferred to a compression moulding device to produce about 2-4 mm thick plates from which the samples were machined into the sample type specified for the particular test method, respectively. 2 mm thick samples were used for the tensile measurements and 4 mm thick samples were used for measurements in bending mode. Compression moulding conditions: 200° C. at low pressure for 10 minutes and for 5 minutes at 614 N/cm² and cooling down at 15° C./min. Table 2 and Table 3 list the composition recipes and mechanical properties for six inventive examples 1E1 to 1E6 and eight comparative examples CE1 to CE8. The inventive examples show a surprisingly good combination of mechanical properties comparing to the CE2-8 examples and bring the mechanical properties closer to CE1.

TABLE 2

Composition recipe and mechanical properties of the inventive samples

| | IE1 | IE2 | IE3 | IE4 | IE5 | IE6 |
|---|---|---|---|---|---|---|
| HE3450-H (0.950 g/cm³) | | | | | | |
| KRUTENE-HD (0.952 g/cm³) | 30 | 45 | 30 | 45 | 60 | 80 |
| PEX RECYCLATE 1 MM | 30 | 30 | 45 | 30 | 30 | 10 |
| CALCITEC M/5 | 40 | 25 | | | | |
| MISTRON 75-6 A | | | 25 | 25 | 10 | 10 |
| sum | 100 | 100 | 100 | 100 | 100 | 100 |
| Stress at break (MPa) | 13.2 | 14.7 | 14.9 | 19.6 | 18.0 | 11.2 |
| Yield stress | 15.4 | 17.8 | 15.7 | 20.6 | 18.5 | — |
| Flexural modulus (MPa) | 1120 | 950 | 1040 | 1330 | 940 | — |
| EAB (%) | 5.4 | 12.2 | 5.3 | 3.9 | 7.2 | 40.0 |
| Charpy NIS 23° C. (kJ/m²) | — | — | — | — | — | 20.1 |
| Charpy NIS −20° C. (kJ/m²) | — | — | — | — | — | 4.4 |

TABLE 3

Composition recipe and mechanical properties of the comparative samples

| | CE1 | CE2 | CE3 | CE4 | CE5 | CE6 | CE7 | CE8 |
|---|---|---|---|---|---|---|---|---|
| HE3450-H (0.950 g/cm³) | 100 | 80 | | | | | | |
| KRUTENE-HD (0.952 g/cm³) | | | | | 55 | 80 | 60 | 100 |
| PEX RECYCLATE 1 MM | | | 60 | 75 | 45 | | | |
| CALCITEC M/5 | | | 40 | | | 40 | | |
| MISTRON 75-6 A | | 20 | | 25 | | 20 | | |
| sum | 100 | 100 | 100 | 100 | 100 | 100 | 100 | 100 |
| Stress at break (MPa) | 23.1 | 4.6 | 10.7 | 10.2 | 6.6 | 5.3 | 13.0 | 8.5 |
| Yield stress | 19.6 | — | 11.9 | 10.5 | 18.1 | — | — | — |
| Flexural modulus (MPa) | 820 | — | 590 | 400 | 620 | — | — | — |
| EAB (%) | 647.0 | 82.0 | 8.4 | 8.9 | 63.8 | 53.0 | 13.9 | 144.0 |
| Charpy NIS 23° C. (kJ/m²) | 56.0 | 34.2 | — | — | — | 8.0 | 16.5 | 18.0 |
| Charpy NIS −20° C. (kJ/m²) | 16.9 | 10.4 | — | — | — | 3.9 | 5.8 | 4.0 |

The invention claimed is:

1. A polyethylene composition comprising a base resin and an inorganic mineral filler which is present in the composition in an amount of 1 to 50 wt % in respect to the weight of composition, wherein the inorganic mineral filler is selected from $CaCO_3$ and Talc, wherein said base resin comprises:
   a) a first crosslinked polyethylene (PEX) having a gel content (measured according to ASTM D 2765:2006) in the range of 5% to 80% in respect to the weight of crosslinked polyethylene (PEX), said crosslinked polyethylene (PEX) being obtained from recycled waste, and
   b) a second polyethylene (PE) selected from virgin polyethylene and recycled polyethylene, or mixtures thereof.

2. Polyethylene composition according to claim 1, wherein the weight ratio of PEX:PE in the base resin is in the range of from higher than 10:90 to 90:10.

3. Polyethylene composition according to claim 1, wherein the crosslinked polyethylene (PEX) is obtained from recycled waste wherein the waste is selected from electrical cable waste.

4. Polyethylene composition according to claim 1, wherein the crosslinked polyethylene (PEX) has a chlorine content in the range of 300 to 2000 ppm measured with X-ray fluorescence analysis (XRF).

5. Polyethylene composition according to claim 1, wherein the crosslinked polyethylene (PEX) has:
   a) a copper content in the range of 20-500 ppm and/or
   b) an aluminum content in the range of 500-15000 ppm, measured with X-ray fluorescence analysis (XRF).

6. Polyethylene composition according to claim 1, wherein the second polyethylene (PE) is selected from virgin high density polyethylene (vHDPE), virgin medium density polyethylene (vMDPE), recycled high density polyethylene (rHDPE), recycled medium density polyethylene (rMDPE) and the mixtures thereof.

7. Polyethylene composition according to claim 1, wherein the composition has a gel content in the range of 10 to 40 wt % in respect to the weight of the base resin as measured according to ASTM D 2765:2006.

8. Polyethylene composition according to claim 1, wherein the composition has a flexural modulus determined according to ISO 178 of more than 840 MPa.

9. Polyethylene composition according to claim 8, wherein the composition additionally has an elongation at break determined according to ISO 527-2 of more than 2%.

10. Polyethylene composition according to claim 8, wherein the composition has a tensile stress at break determined according to ISO 527-2 of more than 13 MPa.

11. Polyethylene composition according to claim 8, wherein the composition has a yield stress determined according to ISO 527-2 of more than 15 MPa.

12. Process for producing a polyethylene composition according to claim 1, wherein the said process comprising the steps of:
   a) feeding the ingredients into the inlet hopper of a compounding unit;
   b) compounding the ingredients which compounding is carried out by homogenizing the ingredients fed into the inlet and raising the temperature to above the melting point of the main thermoplastic polymer ingredient, obtaining a mixture compound; and
   c) optionally cooling down the said mixture compound and pelletizing.

13. Process for producing a shaped article comprising a polyethylene composition according to claim 1, wherein the said process comprises the additional step of shaping the said polyethylene composition with a moulding step.

* * * * *